United States Patent
Furuya et al.

(10) Patent No.: US 6,859,888 B2
(45) Date of Patent: Feb. 22, 2005

(54) DATA STORAGE ARRAY APPARATUS STORING ERROR INFORMATION WITHOUT DELAY IN DATA ACCESS, AND METHOD, PROGRAM RECORDING MEDIUM, AND PROGRAM FOR THE SAME

(75) Inventors: Shinji Furuya, Osaka (JP); Manabu Migita, Neyagawa (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 538 days.

(21) Appl. No.: 09/956,404

(22) Filed: Sep. 19, 2001

(65) Prior Publication Data
US 2002/0049886 A1 Apr. 25, 2002

(30) Foreign Application Priority Data

Sep. 19, 2000 (JP) ........................................ 2000-283014

(51) Int. Cl.$^7$ .............................. G06F 11/00; G06F 12/00
(52) U.S. Cl. ..................... 714/6; 714/7; 714/8; 714/54; 711/114; 711/154; 711/168
(58) Field of Search .............................. 714/6, 7, 8, 54; 711/114, 154, 168

(56) References Cited

U.S. PATENT DOCUMENTS

| | | | | |
|---|---|---|---|---|
| 5,581,690 A | * | 12/1996 | Ellis et al. ..................... 714/6 |
| 5,838,891 A | * | 11/1998 | Mizuno et al. ................. 714/5 |
| 6,330,693 B1 | * | 12/2001 | Lindsay ........................ 714/42 |
| 6,629,273 B1 | * | 9/2003 | Patterson ..................... 714/718 |
| 6,725,392 B1 | * | 4/2004 | Frey et al. ..................... 714/6 |

* cited by examiner

Primary Examiner—Robert Beausoliel
Assistant Examiner—Emerson Puente

(57) ABSTRACT

A data storage array apparatus including multiple disks and writing/reading striped data and parity data onto/from the multiple disk devices, each having a storage area divided into multiple blocks, blocks across the multiple disks forming a group, the apparatus made up of: writing/reading means for writing/reading the striped data and the parity data in a group in accordance with an access request from the outside; error information generation means for generating error information indicating the presence/absence of an error caused by a writing operation by the writing/reading means and storing the error information in a memory; judgement means for, at each writing operation, judging whether the error information should be written to a predetermined group; and control means for controlling the writing/reading means to read error information from the memory and write the error information to the predetermined group according to a result obtained from the judgement means.

27 Claims, 11 Drawing Sheets

FIG. 3A

| DISK / BLOCK | 1 | 2 | 3 | 4 | 5 |
|---|---|---|---|---|---|
| 1 | 00 | 00 | 00 | 00 | 00 |
| 2 | 00 | 00 | 10 | 00 | 00 |
| 3 | 00 | 00 | 01 | 00 | 00 |
| ⋮ | ⋮ | ⋮ | ⋮ | ⋮ | ⋮ |
| 100 | 00 | 00 | 00 | 00 | 00 |

FIG. 3B

| DISK / BLOCK | 1 | 2 | 3 | 4 | 5 |
|---|---|---|---|---|---|
| 1 | 0 | 0 | 0 | 0 | 0 |
| 2 | 0 | 0 | 1 | 0 | 0 |
| 3 | 0 | 0 | 0 | 0 | 0 |
| ⋮ | ⋮ | ⋮ | ⋮ | ⋮ | ⋮ |
| 100 | 0 | 0 | 0 | 0 | 0 |

DATA STORAGE ARRAY APPARATUS STORING ERROR INFORMATION WITHOUT DELAY IN DATA ACCESS, AND METHOD, PROGRAM RECORDING MEDIUM, AND PROGRAM FOR THE SAME

BACKGROUND OF THE INVENTION (1) Field of the Invention

The present invention relates to a data storage array apparatus consisting of multiple data storage devices and provided with redundant data to improve reliability.

(2) Description of the Related Art

Conventionally, data storage array apparatuses (hereafter abbreviated as "array apparatus") are used for increasing speed for data access and improving reliability by distributing data with redundancy over multiple hard disks.

The array apparatuses are well-known as Redundant Array of Inexpensive Disks (RAID). In the RAID-3, for instance, the storage area of each hard disk is divided into a plurality of blocks. Data is divided using the striping method and recorded onto the plurality of blocks, each of which forms a group together with corresponding blocks in the other hard disks including one that is exclusively used for storing parity data. The parity data is normally generated by carrying out the Exclusive-OR between the data blocks other than the parity block for each group.

Should one block of a group include corrupt or invalid data, the array apparatus refers to the parity data and the normal block data in the group to regenerate the normal data of the corrupt or invalid data and overwrite the same.

The array apparatus described in the U.S. Pat. No. 5,581,690 discloses technology for recording status information (error information), which indicates the existence of corrupt or invalid data in each block of each hard disk, on one of the hard disks, so that the use of corrupt or invalid data is prevented. That is, this array apparatus records the status information on the hard disk at each write operation of data and checks the status information immediately before each read operation. If corrupt or invalid data is not included, the apparatus reads the data. If corrupt or invalid data is included, the apparatus regenerates the block in the group.

In the above-described conventional technology, however, there is a problem of increase in a load for performing a write operation of the error information to a disk or a nonvolatile memory, because the size of the error information is increased to on the order of megabytes as storage capacity of hard disks and data transfer rate are increased.

For example, when writing material data for digital broadcast, such as Digital Video (DV) data, from the outside to the array apparatus in real time or sequentially, there is a problem that the write operation cannot be performed in real time or the delay occurs. This is because a write operation of data and parity data to a block to a group is necessarily followed by a write operation or an update operation of error information to disks or a nonvolatile memory, so that the ratio of this write or update operation occupying a bus is increased, which reduces the time for allowing the write operation of the material data to occupy the bus.

SUMMARY OF THE INVENTION

The object of the invention is therefore to provide a data storage array apparatus for, when writing data from the outside to the apparatus in real time or sequentially, storing the error information without delay in a write/read operation of the data, so that giving a real time write operation.

The above-stated object can be realized by a data storage array apparatus (hereafter called "apparatus A") that includes a plurality of disk devices which each have a storage area divided into a plurality of blocks, each block in a disk device forming a group together with corresponding blocks in the other disk devices, and that writes/reads striped data and parity data to/from a group, the data storage array apparatus made up of: writing/reading means for writing/reading the striped data and the parity data to/from a group in accordance with an access request inputted from the outside of the apparatus; error information generation means for generating error information indicating the presence or absence of an error for each group caused by a writing operation by the writing/reading means and storing the generated error information in a memory; judgement means for, each time the writing/reading means completes a writing operation, judging whether error information stored in the memory should be written to a predetermined group; and control means for controlling the writing/reading means to read error information from the memory and write the error information to the predetermined group in accordance with a result obtained from the judgement means.

In the above construction, the error information stored in the memory may be written into a nonvolatile memory as a substitute for the predetermined group.

According to this construction, the error information is not written to the predetermined group (or into the nonvolatile memory) every time data is written. Instead, in some cases depending on the result of the judgement, the error information is not written after write operations of data. Thereby, when writing/reading data from the outside of the apparatus in real time or sequentially, the apparatus can store the error information in real time without delay in write operations of data from the outside.

In the above apparatus A, the error information is bit map data including a flag for each block, each flag indicating the presence or absence of a write time-out error or a medium error.

Alternatively, in the above apparatus A, the judgement means judges that the error information stored in the memory should be written to the predetermined group if there are no any access requests from the outside of the apparatus.

With this construction, the data storage array apparatus writes the error information to the predetermined group if there are no external access requests. Thus, the write operation of the error information does not adversely affect the execution of the following access request that has been already inputted.

In the above apparatus A, the judgement means counts the number of times of writing operations by the writing/reading means, and judges that the error information stored in the memory should be written to the predetermined group if the counted number of times is a threshold value or above. Here, counted number of times is reset each time the error information is written to the predetermined group.

With this construction, the data storage array apparatus writes the error information to the predetermined group once every time write operations of data are conducted the same number of times as the threshold value.

In this construction, the judgement means changes the threshold value as an access frequency by the writing/reading means changes.

With this construction, since the threshold value dynamically changes as the access frequency changes, data access in accordance with access requests and write operations of the error information can be appropriately balanced.

The above-stated apparatus A may further includes regeneration means for, if the error information indicates the presence of an error, regenerating data in the block with the error using data in the other blocks in the group to which the block with the error belongs. Here, the judgement means judges that the error information stored in the memory should not be written to the predetermined group for a duration when the regeneration means performs the regeneration operation.

With this construction, the data storage array apparatus does not write the error information to the predetermined group if data in the block with the error is now being regenerated. Thus, access requests can be processed with high priority.

In the above apparatus A, the judgement means changes a frequency for judgement as a writing/reading frequency by the writing/reading means changes.

With this construction, since the data storage array apparatus dynamically changes the frequency for judgement as the frequency for access requests changes, data access in accordance with access requests and write operations of the error information can be appropriately balanced.

The above-stated apparatus A may further includes a nonvolatile memory having a storage area for storing the error information. Here, the control means writes the error information into the nonvolatile memory immediately before a power of the data storage array apparatus turned OFF (hereafter called "apparatus B").

In this construction, the error information is bit map data including a flag for each block, the flag indicating the presence or absence of a write time-out error. Here, the data storage array apparatus is further made up of: regeneration means for(a) reading the bit map data from the nonvolatile memory immediately after the power of the data storage array apparatus turned ON or being reset, and (b) if only one flag indicates an error state, inhibiting a reading operation from a block corresponding to the flag, and regenerating data in the block.

With this construction, even if the power of the apparatus is turned OFF before data in a block with error is regenerated, the apparatus can function normally after restart of the apparatus.

In the above apparatus B, the error information is bit map data including a flag for each block, the flag indicating the presence or absence of a write time-out error. Here, the data storage array apparatus is further made up of: regeneration means for reading the bit map data from the predetermined group immediately after the power of the data storage array apparatus turned ON or being reset and generating a reading bit map containing a flag indicating a reading error caused by the reading operation for each block in the predetermined group, carrying out the logical OR between the generated reading bit map and a part of the bit map data that is stored in the nonvolatile memory and corresponds to each group, and if the bit map obtained from the logical OR indicates only one error, inhibiting a reading operation from the block with the error and regenerating data in the block.

With this construction, high reliability can be realized simply by carrying out the logical-OR between the error information (i.e., bit map data) and the reading bit map.

The above-stated apparatus A is further made up of: a nonvolatile memory having a storage area for storing the error information. Here, the control means controls the writing/reading means to read the error information from the memory and write the error information to the predetermined group in accordance with a result obtained from the judgement means, and writes the error information into the nonvolatile memory.

With this construction, the error information is written not only to the predetermined group but also into the nonvolatile memory. Thus, the error information can be written with high reliability.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 3 shows bit map data in accordance with the result of an external data write operation;

DESCRIPTION OF THE PREFERRED EMBODIMENT

Embodiment 1

Figure 1:
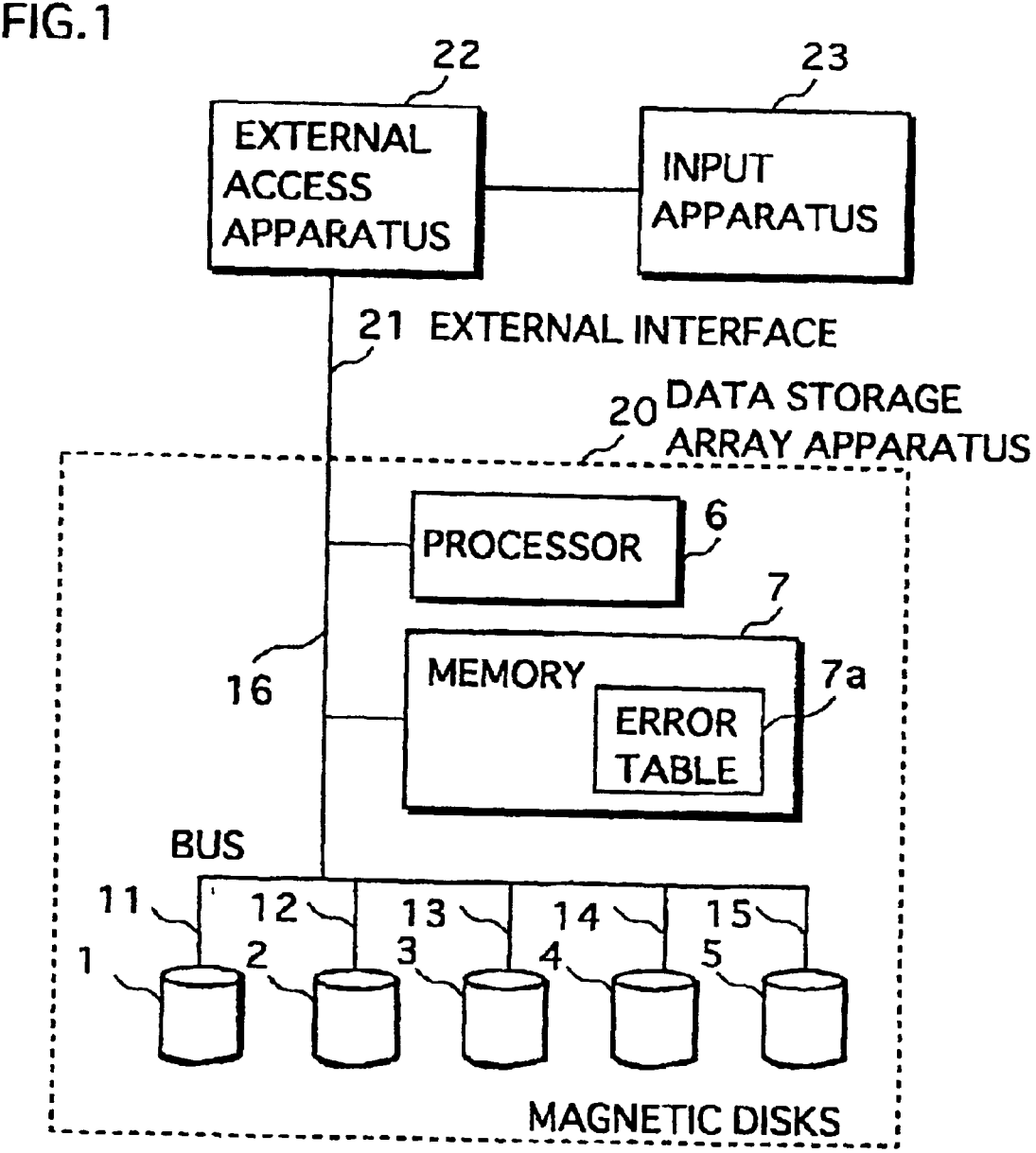
FIG. 1 is a block diagram showing a data storage system that includes a data storage array apparatus according to the first embodiment of the invention.

FIG. 1 shows the construction of a data storage system according to the first embodiment of the invention. The data storage system includes an external access apparatus 22, an input apparatus 23, and a data storage array apparatus 20 (hereafter abbreviated as "array apparatus").

The external access apparatus 22 issues a write request to the array apparatus 20 in accordance with the data inputted by the input apparatus 23. The external access apparatus 20 also issues a read request to the array apparatus 20 and outputs the read data to the other apparatus (not shown).

The input apparatus 23 is a Digital Video (DV) camera for broadcasting, for example. The input apparatus 23 outputs video data, such as DV data, as the material data of the broadcasting program to the external access apparatus 22.

When receiving an access request (i.e., a write/read request) from the external access apparatus 22, the array apparatus 20 performs the requested write/read operation to the internal disk array. In the case of the write operation, the array apparatus 20 generates error information which indicates the existence of corrupt or invalid data and temporarily stores the error information in the internal memory. The error information stored in the internal memory is transferred to the disk array in the array apparatus 20 with appropriate timing. In other words, the array apparatus 20 is constructed so that the error information is transferred to the disk array therein only when there is no access request, while the error information is directly written to the disk at each write operation of data in the conventional apparatus. In this way, the array apparatus of the invention is constructed so that the write operation of the error information is performed only when there is no access request, data access does not frequently occur, the bus linked with the disks is not occupied, or the like. Such a construction does not adversely affect the write/read operation of data.

More specifically, in terms of the hardware construction, the array apparatus 20 includes magnetic disks 1–5 (disk array), a processor 6, and memory 7 as shown in FIG. 1. These elements are connected via busses 11–16.

The busses 11–15 are Small Computer System Interface (SCSI) busses, for example, each of which connect each of the magnetic disks 1–5 with a SCSI controller (not shown). The bus 16 is a Peripheral Component Interconnect (PCI) bus and connects the external interface 21 with the SCSI controller (not shown). The processor 6 and the memory 7 are linked with the bus 16.

Figure 2:
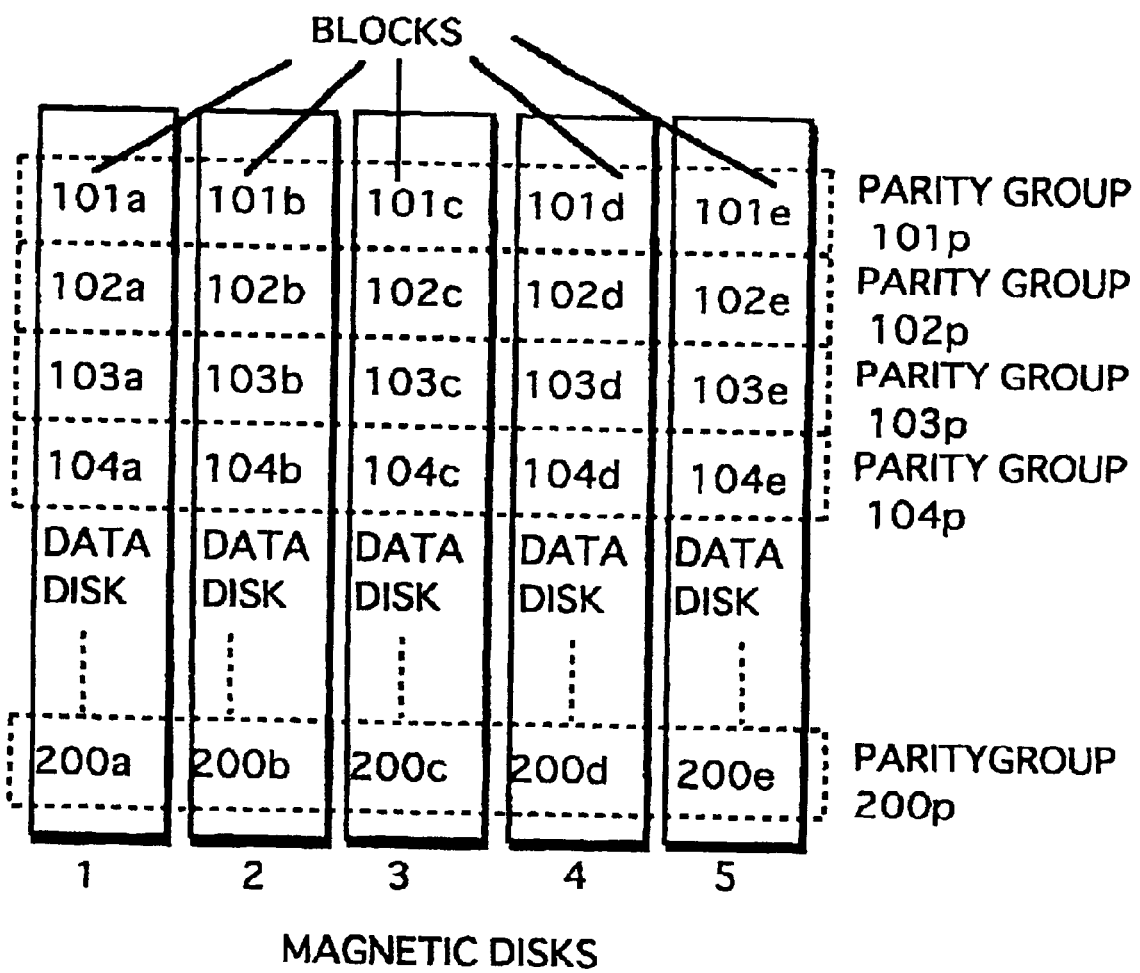
FIG. 2 shows blocks and parity groups in a magnetic disk.

A storage area of each of the magnetic disks 1–5 includes a plurality of partitioned areas (hereafter referred to as a block) as shown in FIG. 2. In this figure, the magnetic disk 1 consists of 100 blocks between block 101a and block 200a. The same holds true for the magnetic disks 2–5. One block is 512 kilobytes in size. Among the plurality of magnetic disks, the blocks with the same number construct a parity group (101p to 200p). The magnetic disk 5 is a parity disk for storing parity data for each parity group in each block thereof.

The processor 6 has a queue for queuing access requests inputted from the external access apparatus 22 to retrieve an access request from the queue one by one and executes the access operation (i.e., write/read operation) to the magnetic disks 1–5. Here, at each write operation, the processor 6 generates error information and stores the error information in the memory 7. Then, the processor 6 transfers the error information from the memory 7 to the magnetic disk 5 only a duration when there is no access request. The reason for transferring the error information to the magnetic disk is for securely storing the error information even when the power being OFF and the system being reset. In addition, at each read operation, the processor 6 refers to the error information and regenerates (reconstructs) the data as needed.

The memory 7 stores information indicating a result of write operations to the magnetic disks 1–5 (error information), the number of times of write operations of data from the outside, a flag for data reconstruction, and so on, in addition to programs to be executed by the processor 6. The error information is bitmap data showing the existence of a time-out error at a write operation (hereafter called "write time-out error") or a writing error due to a recording medium (hereafter called "medium error") using a flag for each block. This error information is stored in the error table 7a within the memory 7. The number of times of write operations of data from the outside represents the number of times of write operations of data from the outside (hereafter called "external data write operation") to the magnetic disks 1–5 after the last write operation of the bit map data (hereafter called "bit-map-data write operation") stored in the error table 7a to the magnetic disks 1–5. The flag for data reconstruction indicates whether the data is now being reconstructed or not. All of these information is updated by the processor 6.

FIG. 3A shows an example of the bit map data stored in the error table 7a. As shown in FIG. 3A, the bit map data includes 2-bit data (2 flags) for each block in the magnetic disks 1–5. The left flag indicates the existence of the write time-out error (that is, the existence of invalid data), and the right flag indicates the existence of the medium error (the existence of anomaly in sectors) at the write operation (that is, the existence of corrupt data). The numerals 1 and 0 represent the presence and absence of errors, respectively. The write time-out error requires regeneration of data in the parity group, while the medium error requires substitution of the magnetic disk having an error (which includes to save the data in storage means other than the magnetic disk, substitute the magnetic disk with a new magnetic disk, restore the saved data in the new magnetic disk, and regenerate the data in the group using the parity data).

FIG. 3B shows another example of the bit map data. As shown in this figure, the bit map data has one flag indicating the existence of a write time-out error for each block in the magnetic disks 1–5. In an alternative example, one flag may represent logical OR between a write time-out error and a medium error.

Suppose in the following description that the bit map data shown in FIG. 3B is stored in the error table 7a for the sake of convenience.

The following describes operations by the data storage system having the above-described construction.

Figure 4:
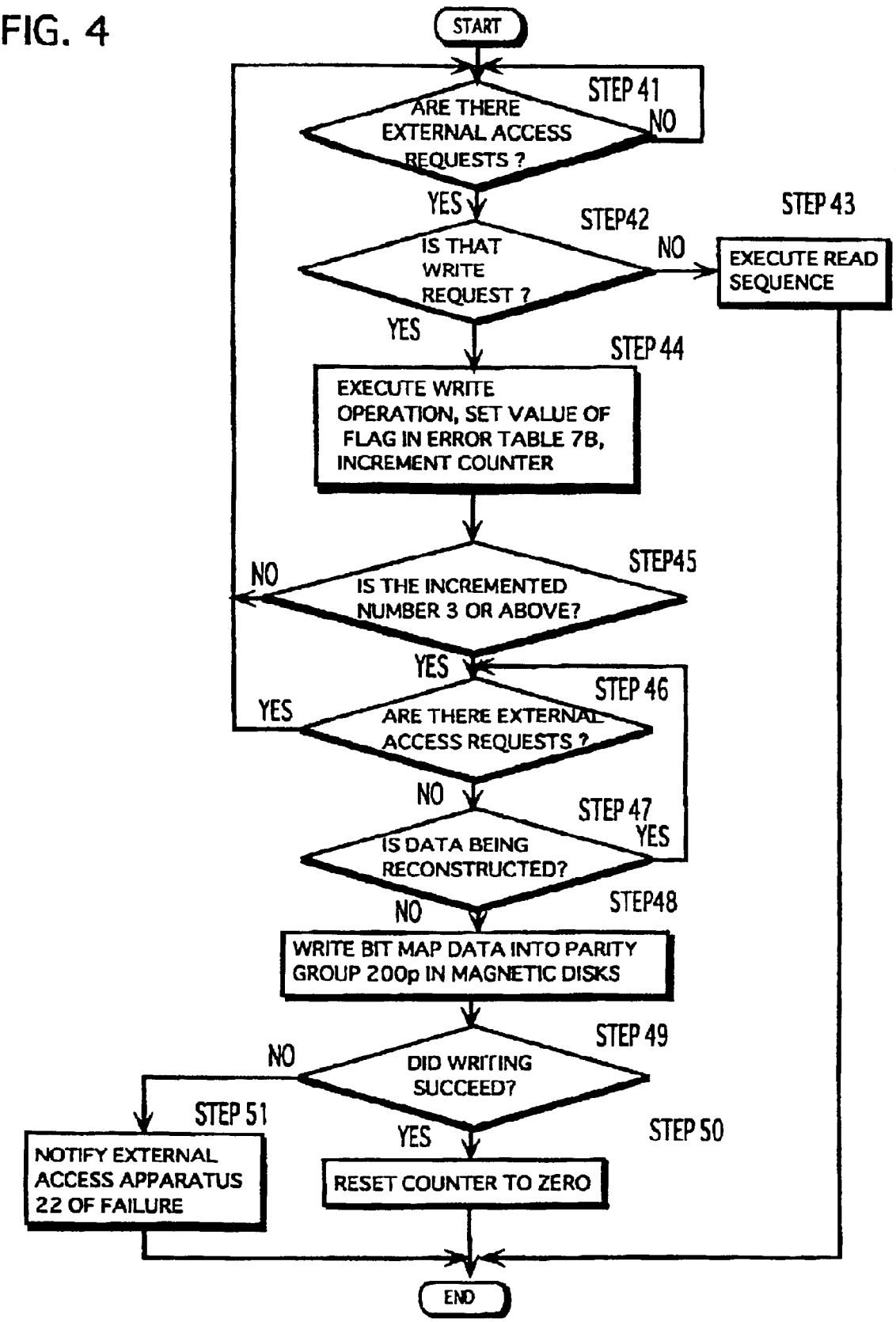
FIG. 4 is a flow chart showing operations by the processor 6.

FIG. 4 is a flow chart showing operations by the processor 6 for processing an access request from the outside.

The processor 6 always keeps track of whether there is an access request in the queue or not (that is, not empty or empty) (Step 41). If there are some access requests and the access request at the head of the queue is a write request (Step 42), the processor 6 executes an external data write operation to the magnetic disks 1–5 in accordance with the write request, writes a value of a flag in the error table 7b in accordance with the result of the external data write operation, and increments the number of times of external data write operations (Step 44). Each time an external data write operation is executed, the processor 6 writes a flag in the error table 7b within memory 7, the flag corresponding to the block in the group for which the external data write operation has been executed.

Next, if the number of times of external data write operations is 3 (=threshold value) or above (Step 45), there is no external access request in the queue (Step 46), and reconstruction of data does not occur (Step 47), then the processor 6 reads the bit map data from the error table 7b and writes the bit map data to the parity group 200p across the magnetic disks 1–5 (Step 48). In this case, the processor judges whether the reconstruction of data occurs or not by the state of the flag for data reconstruction. If the bit map data can be successfully written to the parity group 200p, the processor 6 makes the number of times of external data write operations zero (Steps 49 and 50). If the bit map data fails to be written, then the processor 6 does not change the number of times of external data write operations and informs the external access apparatus 22 of the failure by writing the error status (Step 51). Note that the success at an external data write operation means that either the write time-out error or the medium error does not occur, while the failure means that at least one of the two errors occurs.

Alternatively, if the access request at the head of the queue is a read request (at Step 42: No), then the processor 6 executes a read sequence (Step 43). In this read sequence, the processor 6 refers to a flag for each block in the group as a target of the read operation in the error table 7a. If the flag is not set, then the processor 6 reads the data from the magnetic disks 1–5. If one flag is set, then the processor 6 inhibits the read operation from the corresponding block, regenerates the data using other blocks (including data and parity data), outputs the regenerated data as read data to the external access apparatus 22.

As described above, according to the array apparatus of this embodiment, a bit-map-data write operation from the error table 7b to the magnetic disks is not performed at each external data write operation. In other words, according to the array apparatus of this embodiment, the number of times of bit-map-data write operations is limited to the number less than that of external data write operations and the bit-map-data write operation is performed only when there is no access request, which does not adversely affect a write/read operation of data from the outside.

At Step 44 in FIG. 4, each time an external data write operation to the magnetic disks is performed, the processor 6 sets a value of a flag within the error table 7b, which corresponds to the block in the group as a writing target. However, this procedure may be altered so that the corresponding flag is set to 1, only when a write time-out error occurs at an external data write operation.

In addition, at Step 48, if any write errors do not occur at the last three (=threshold value) external data write operations, the processor 6 may not perform a bit-map-data write operation to the parity group 200p across the magnetic disks 1–5.

Moreover, although the following conditions (a) to (c) are established in the flow chart shown in FIG. 4 to write the bit map data to the parity group 200p across the magnetic disks 1–5, at least one of the following conditions (a) to (d) may be used:

(a) the number of times to external data write operations is more than the threshold value;

(b) there is no external access request;

(c) reconstruction of data does not occur; and (d) a write error has occurred in the last external data write operations executed the number equal to the threshold value of times.

Furthermore, the threshold value for the number of times of external data write operations may not be set at a fixed value. Instead, the frequency of a bit-map-data write operation to the parity group 200p may be adjusted by measuring an external access frequency (i.e., the number of times of external accesses per unit of time) and increasing the threshold value as the external access frequency increases.

In addition, the bit map data is written to the parity group 200p across the magnetic disks 1–5 in this embodiment. Instead, the bit map data may be written in a single magnetic disk or a nonvolatile memory such as a flash memory.

This embodiment describes as to the error table shown in FIG. 3B. In the case of the error table shown in FIG. 3A, however, the procedure may be added so that necessity for substitution of disks is notified if a flag for a medium error is set for the block in the group as a target of the read operation at the read sequence of Step 43.

Embodiment 2

Figure 5:
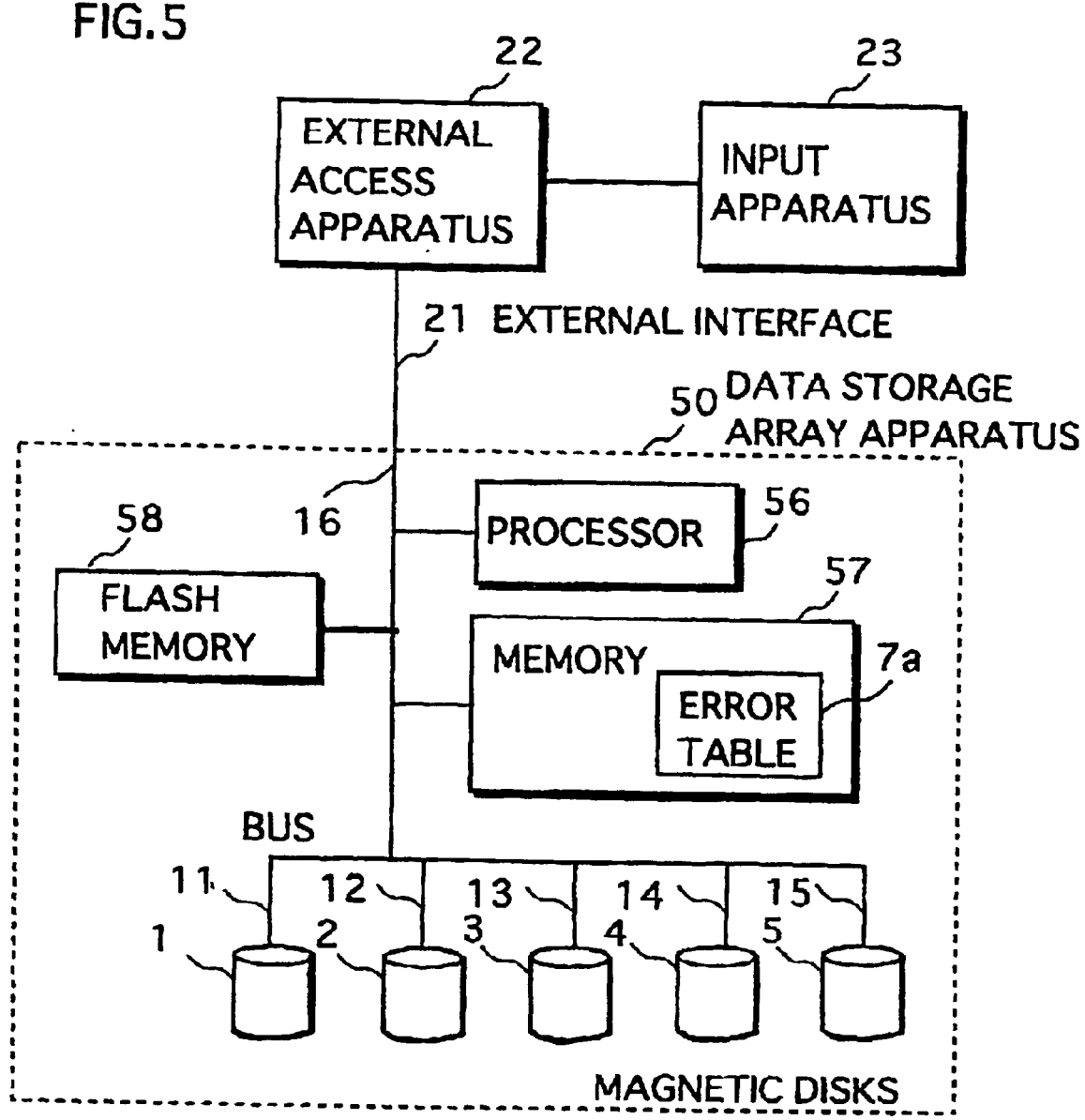
FIG. 5 is a block diagram showing a data storage system that includes a data storage array apparatus according to the second embodiment of the invention.

FIG. 5 shows the construction of a data storage system including an array apparatus according to the second embodiment of the invention. Compared with the construction of the array apparatus 50 shown in FIG. 1, the array apparatus shown in FIG. 5 has a processor 56 and memory 57 instead of the processor 6 and the memory 7, respectively, and a flash memory 58 newly added. The construction elements with the same reference numerals as in FIG. 1 function in the same manner, and so the following description omits their explanation but focuses on different points.

Compared with the processor 6, the processor 56 has added functions for writing the bit map data in the flash memory 58 by executing a program stored in the memory 57 and checking the bit map data written in the flash memory 58 immediately after the power is turned ON (at the starting of the system) and the system is reset. The processor 56 functions in the same manner as the processor 6 except for such added functions.

The memory 57 functions in the same manner as the memory 7 except for storing an execution program for not the processor 6 but the processor 56.

Figure 9:
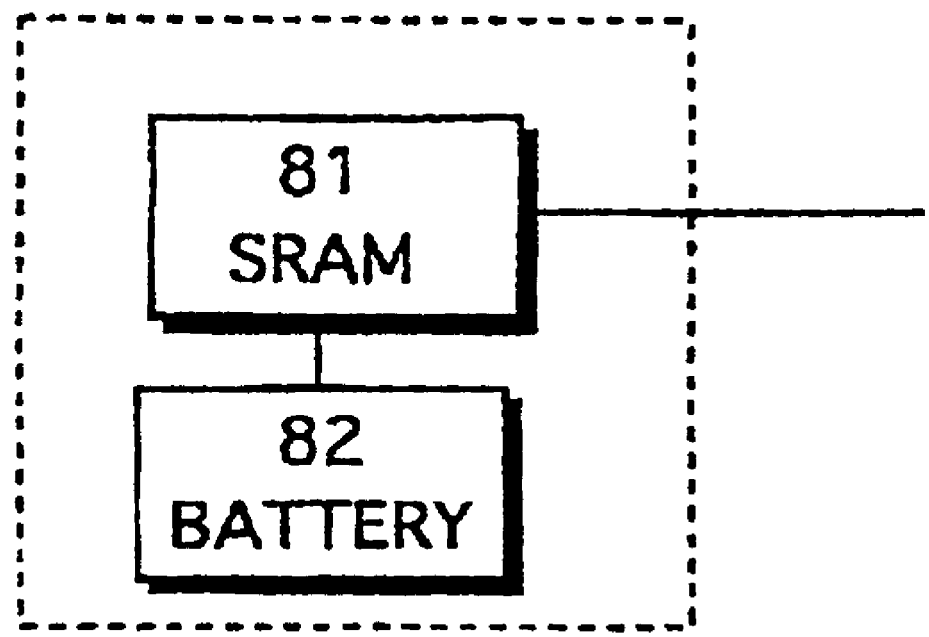
FIG. 9 is a block diagram of the SRAM with a battery.

The flash memory 58 is a nonvolatile memory for storing bit map data. Note that, instead of the flash memory 58, a SRAM 81 with a battery 82 as a battery backed-up memory (FIG. 9) may be provided.

Figure 6:
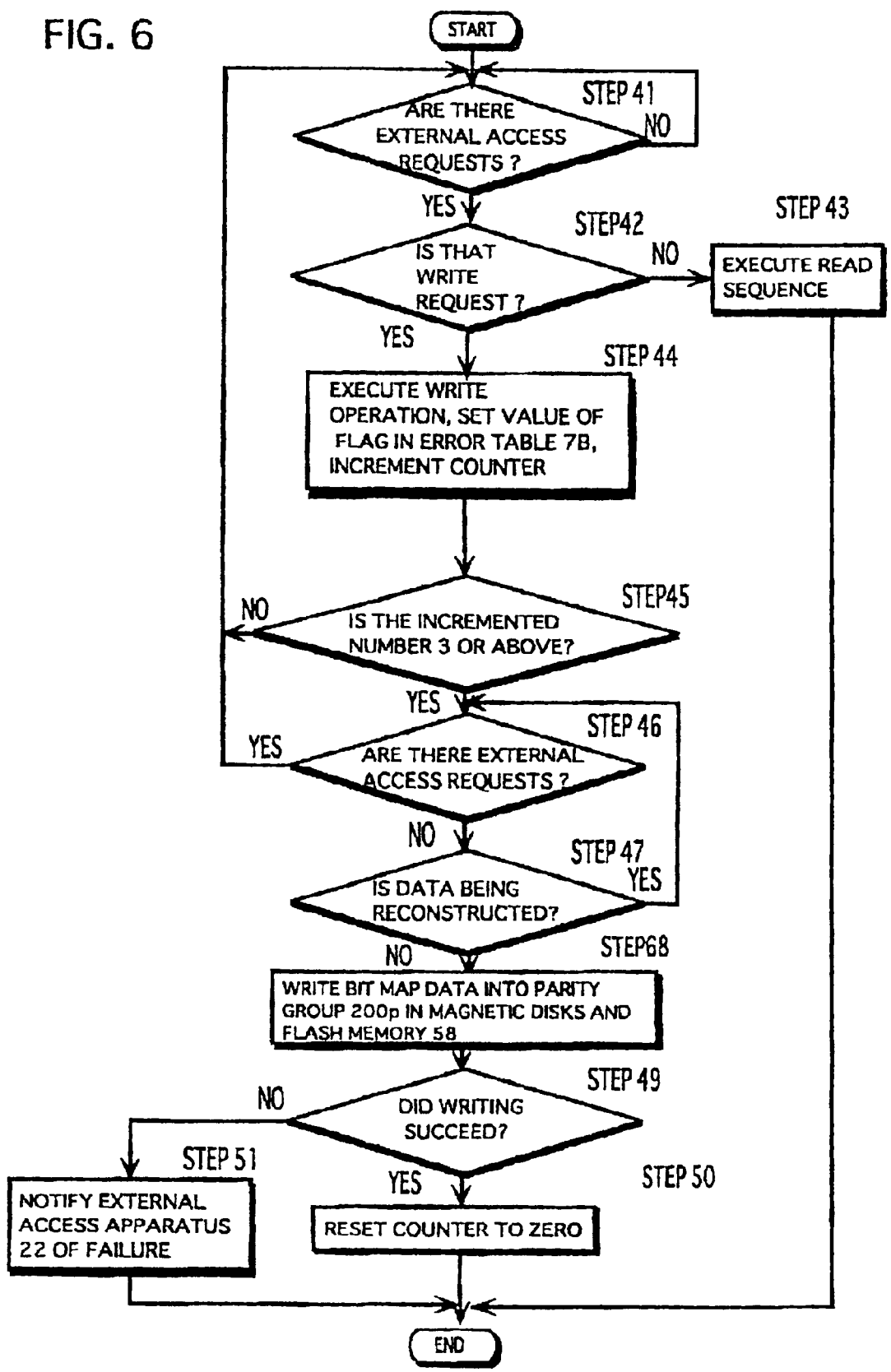
FIG. 6 is a flow chart showing operations by the processor 56.

FIG. 6 is a flow chart showing operations by the processor 56 for processing external access requests. The procedure in this figure is different from FIG. 4 in that Step 68 is provided instead of Step 48 in FIG. 4.

At Step 68, the processor 56 executes an external data write operation to the magnetic disks and sets a value of a flag, which corresponds to each block in the group as a writing target, in the bit map data within the error table 7a in accordance with the result of the external data write operation. At the same time, the processor 56 writes the bit map data to the parity group 200p across the magnetic disks 1–5 and writes a parity group address where the bit map data has been written (an address for 200p) and the bit map data to the flash memory 58. Other steps are the same as in FIG. 4.

Figure 7:
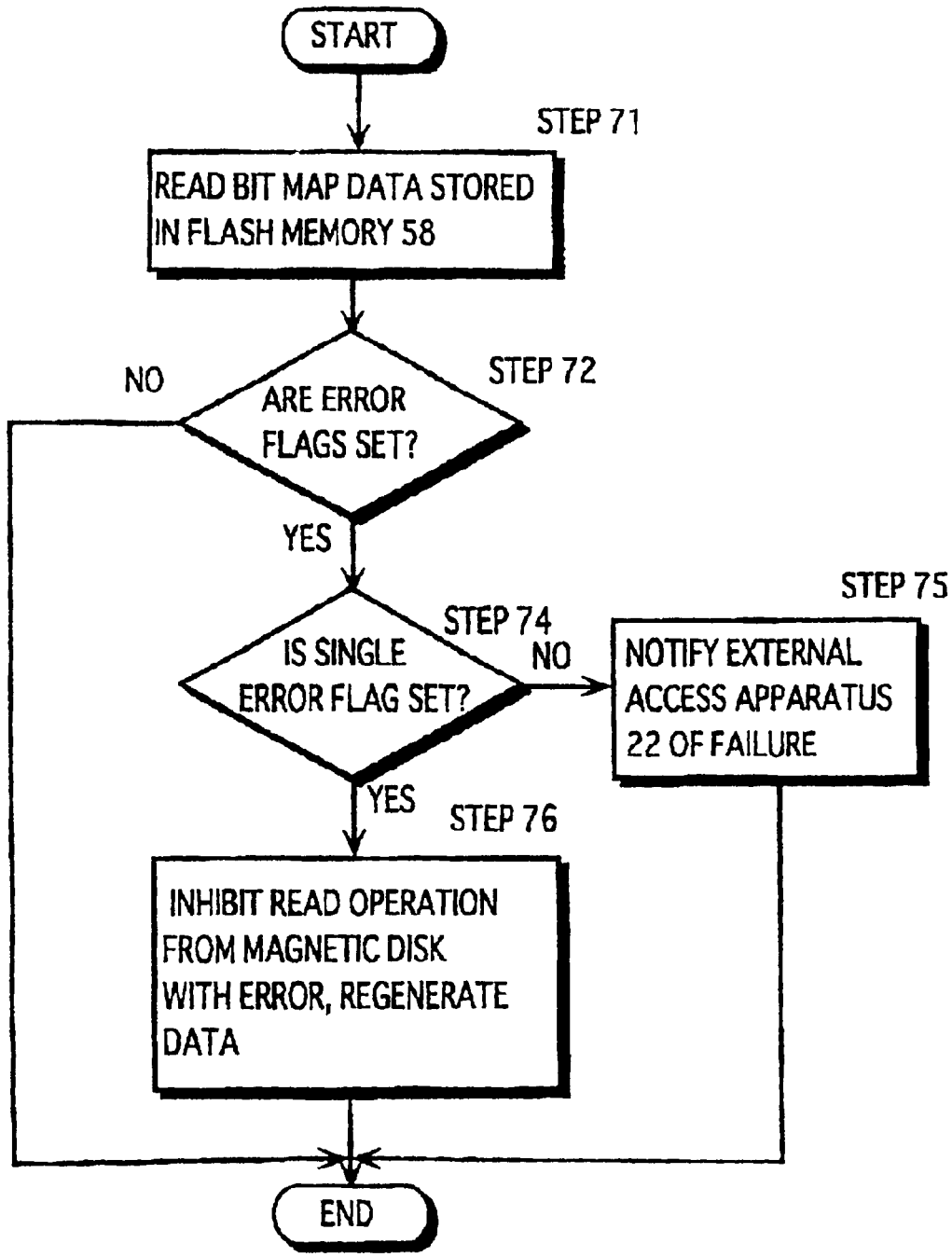
FIG. 7 is a flow chart showing operations by the processor 56.

FIG. 7 is a flow chart showing operations by the processor 56 immediately after the power is turned ON and the system is reset.

In this figure, the processor 56 refers to the parity group address and the bit map data stored in the flash memory 58 (Step 71). If any error flags are not set (at Step 72: No), the procedure goes to END (goes to the procedure shown in FIG. 6).

If two or more error flags are set (at Step 74: No), the processor 56 informs the external access apparatus of the failure of the system (Steps 74 and 75).

If one error flag is set (at Step 74: Yes), the processor 56 temporarily inhibits a read operation from the block in which the error occurred and regenerates the data using other blocks (including data and parity data) in the group to which the block with error belongs (Step 76).

As described above, according to the array apparatus 50 in this embodiment, redundant bit map data is stored in the flash memory 58 also, so that data can be regenerated at high speed even when errors are detected at the starting of the system or immediately after reset of the system, which improves reliability of the system.

Figure 8:
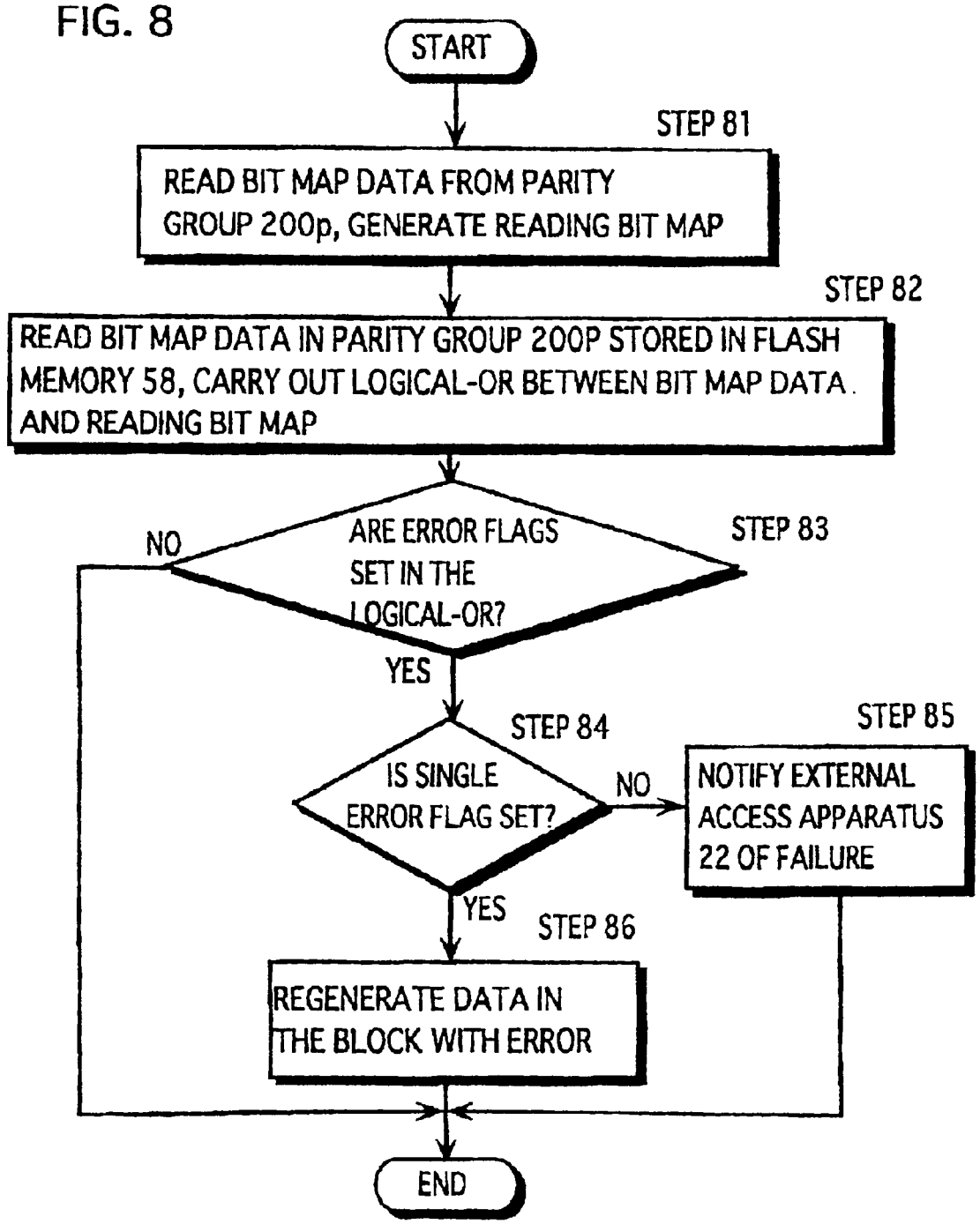
FIG. 8 is a flow chart showing operations by the processor 56.

Here, the operations by the processor 56 at the starting of the system and immediately after reset of the system may be altered as in the operations shown in the flow chart in FIG. 8 instead of the flow chart in FIG. 7.

In FIG. 8, the processor 56 reads bit map data from the parity group 200p across the magnetic disks 1–5, and generates a reading bit map in which read time-out errors and reading errors for a recording medium are represented by flags (Step 81). Then, the processor 56 carries out the logical OR between the bit map data stored in the flash memory 58 and the generated reading bit map (step 82). If an error flag is set to single magnetic disk (Steps 83 and 84), then the processor 56 regenerates data (Step 86). Note that the above logical OR can be obtained by carrying out the logical OR between a bit map for one group included in the bit map data stored in the flash memory 58 and the reading bit map for each bit map data for one group.

Thereby, in addition to the bit map data stored in the flash memory 58, the reading error flags included in the above reading bit map can be fed back, which further improves reliability of the system.

In addition, at Step 68 in FIG. 6, the processor 56 writes the bit map data stored in the memory 57 to the parity group 200p across the magnetic disks, while writing the parity group address where the bit map data has been written (the address for 200p). However, the bit-map-data write operation to the flash memory 58 may be performed not at this timing but immediately before the system is turned OFF.

Moreover, in the previously stated first embodiment of the invention, the array apparatus may be provided with a flash memory, and the flow chart shown in FIG. 4 at Step 48 may be altered so that bit map data is written in the flash memory as a substitute for the parity group 200p.

Embodiment 3

While the bit map data with the same content as in the parity group 200p (hereafter called "first bit map data") is stored in the flash memory in the array apparatus according to the above second embodiment, second bit map data is stored in the flash memory 58 in this third embodiment. The second bit map data indicates the presence or absence of errors when the processor 56 writes bit map data (i.e., the first bit map data), which is stored in the error table, to the parity group 200p. The second bit map data contains a flag for each block making up of the parity group 200p.

Since the hardware construction of the data storage system in this embodiment is the same as in FIG. 5, the following description omits their explanation but focuses on different points.

Figure 10:
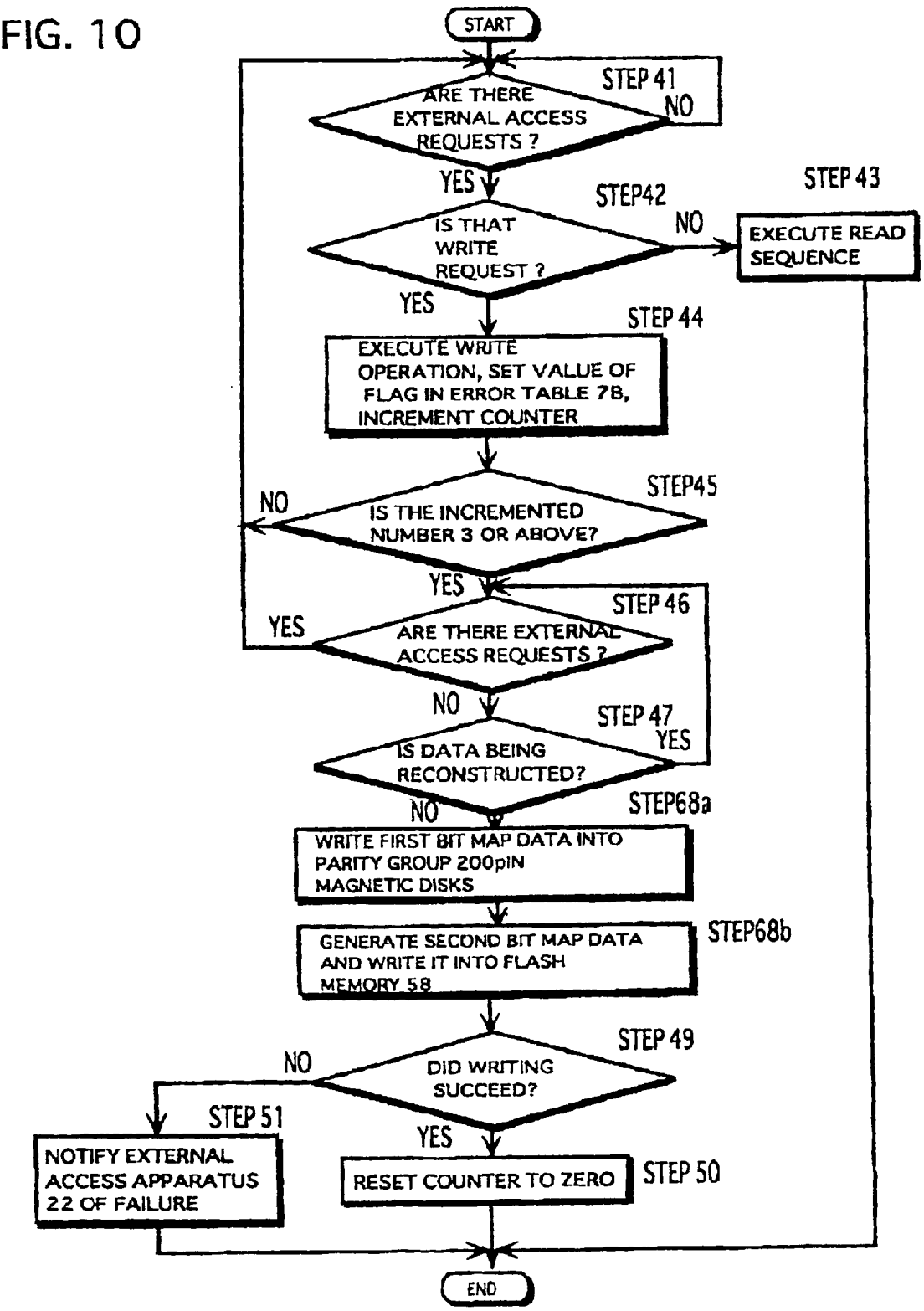
FIG. 10 is a flow chart showing operations by the processor 56 according to the third embodiment.

FIG. 10 is a flow chart showing operations by the processor 56 for processing access requests from the outside of the apparatus. The procedures in this figure are different from those in FIG. 6 in that Steps 68a and 68b are included as a substitute for Step 68 in FIG. 6.

At Step 68a, the processor 56 executes a write operation to the magnetic disks, sets values for flags in the first bit map data stored in the error table 7a, each flag corresponds to one block in a group as a target of the write operation, and writes the first bit map data in the parity group 200p across the magnetic disks 1–5.

At Step 68b, the processor 56 generates the second bit map data indicating the presence or absence of errors occurring at the write operation of the first bit map data in the parity group 200p and then writes the generated second bit map data and the address for the parity group 200p onto the flash memory.

Figure 11:
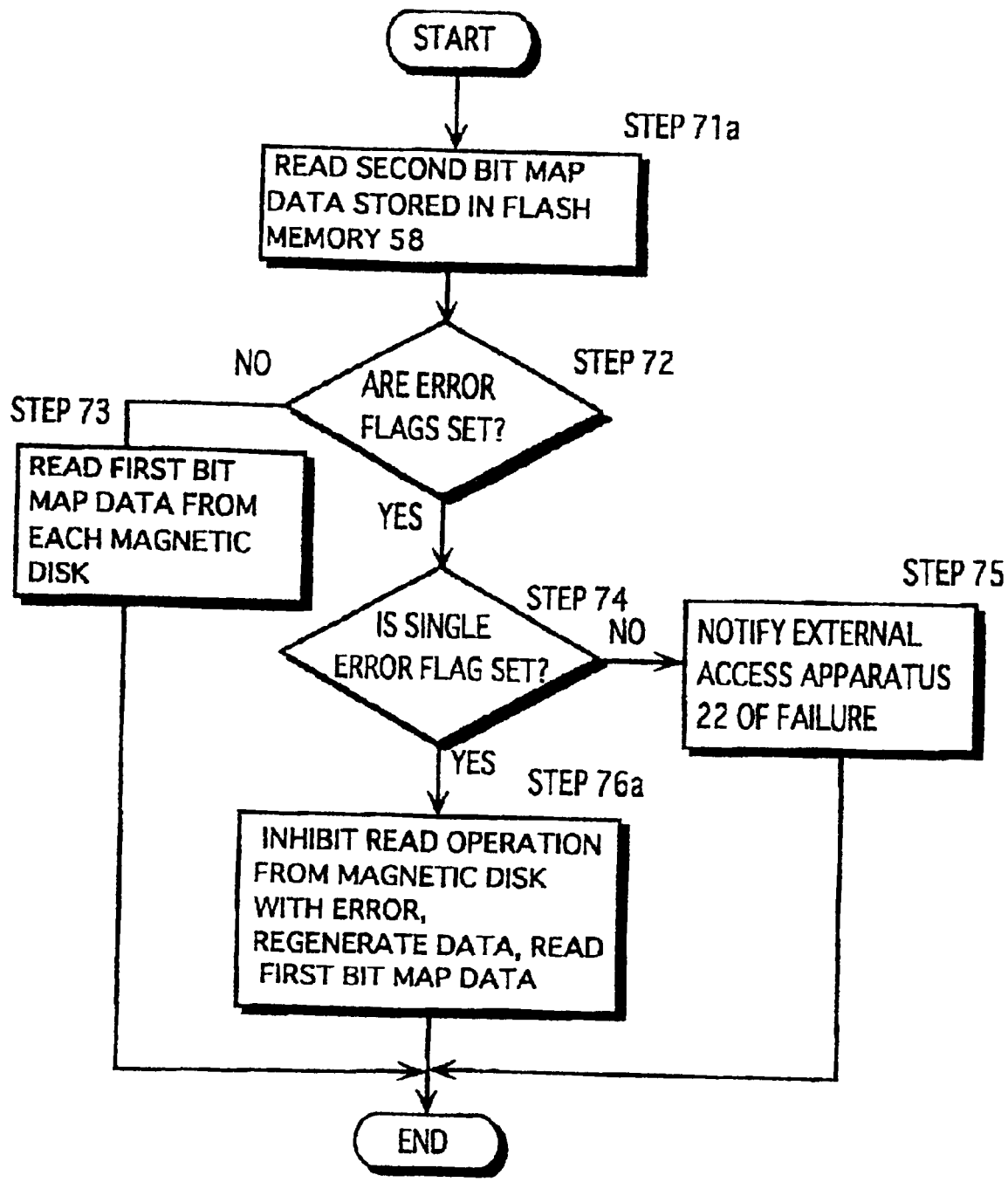
FIG. 11 is a flow chart showing operations by the processor 56 according to the third embodiment.

FIG. 11 is a flow chart showing operations by the processor 56 immediately after the power of the apparatus turned ON or the system being reset. The procedures in this figure are different from those in FIG. 7 in that Step 71a and 76a are included as substitutes for Step 71 and 76, respectively, and Step 73 is added.

At Step 71a, the processor 56 reads the address for the parity group (hereafter called "parity group address") and the second bit map data stored in the flash memory 58. The following Steps 72–76 are the same as in FIG. 7.

In the case that any error flags are not set (At Step 72: No), the procedure goes to Step 73 where the processor 56 reads the bit map data from the parity group across the magnetic disks 1–5 and stores the bit map data in the error table 7a. Here, the parity group is identified by the parity group address.

At Step 76a, in addition to the procedure at Step 76, the processor 56 reads the bit map data from the parity group across the magnetic disks 1–5 and stores the bit map data in the error table 7a. Here, the parity group is identified by the parity group address. Note that, while Steps 72 and 74–76 in FIG. 7 are executed for flags for each group that corresponds to each parity group, Steps 72–75 and 76a in FIG. 11 are executed for flags that correspond to the parity group 200p.

As stated above, the array apparatus in this embodiment stores the second bit map data in the flash memory, the second bit map data indicating the presence or absence of errors occurring at a write operation of the error information (the first bit map data) in the parity group 200p, and checks the second bit map data immediately after the power turned ON and the system being reset. Thus, error information with high reliability can be stored.

In this embodiment, the procedures shown in FIG. 8 may be substituted for those in FIG. 11. In this case, Step 82 should carry out the logical-OR between the reading bit map and the second bit map data.

The invention can be embodied by executing programs stored in the memory 7 or 57 on the hardware construction shown in FIG. 1 or 5 by means of the processor 6 or 56. The details of the programs are as above with reference to the flow charts. These programs may be down loaded (or installed) in the other well-known disk array apparatuses having the similar construction to FIG. 1 or 5 through a program recording medium or a communication network to be executed thereon.

Instead of regeneration (reconstruction) of data as described in the above embodiments, the following procedure (a) or (b) may be chosen as occasion demands.

(a) In the case that an error flag has been set before a read operation according to a read request, the processor 6 or 56 regenerates data in the block with the error using data in the other blocks in the same group, and returns the regenerated data as read data to the outside of the apparatus. In the procedure (a), the processor 6 or 56 does not write the regenerated data into the block (in the magnetic disk).

(b) In the case that an error flag has been set, the processor 6 or 56 regenerates data in the block with the error using data in the other blocks in the same group, and writes the regenerated data into the block (in the magnetic disk).

The procedure (a) may be chosen at read operation according to a read request, for example. This is because the procedure (a) can realize speedy response to the read request. In this case, the procedure (b) can be executed before the power turned OFF, during idle time (when continuous access requests do not occur), or the like. Alternatively, the procedure (b) maybe chosen immediately after the power turned ON or the system being reset.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A data storage array apparatus that includes a plurality of disk devices which each have a storage area divided into a plurality of blocks, each block in a disk device forming a group together with corresponding blocks in the other disk devices, and that writes/reads striped data and parity data to/from a group, the data storage array apparatus comprising:

writing/reading means for writing/reading the striped data and the parity data to/from a group in accordance with an access request inputted from the outside of the apparatus;

error information generation means for generating error information indicating the presence or absence of an error for each group caused by a writing operation by the writing/reading means and storing the generated error information in a memory;

judgement means for, each time the writing/reading means completes a writing operation, judging whether error information stored in the memory should be written to a predetermined group; and control means for controlling the writing/reading means to read error information from the memory and write the error information to the predetermined group in accordance with a result obtained from the judgement means.

2. The data storage array apparatus according to claim 1, wherein the error information is bit map data including a flag for each block, each flag indicating the presence or absence of a write time-out error or a medium error.

3. The data storage array apparatus according to claim 1, wherein the judgement means judges that the error information stored in the memory should be written to the predetermined group if there are no any access requests from the outside of the apparatus.

4. The data storage array apparatus according to claim 1, further comprising:

a queue for queuing the access requests from the outside of the apparatus, wherein the writing/reading means inputs the access request from the outside of the apparatus through the queue, and the judgement means judges that the error information stored in the memory should be written to the predetermined group if there are no any access requests in the queue.

5. The data storage array apparatus according to claim 1, wherein the judgement means counts the number of times of writing operations by the writing/reading means, and judges that the error information stored in the memory should be written to the predetermined group if the counted number of times is a threshold value or above, wherein the counted number of times is reset each time the error information is written to the predetermined group.

6. The data storage array apparatus according to claim 5, wherein the judgement means changes the threshold value as an access frequency by the writing/reading means changes.

7. The data storage array apparatus according to claim 1, further comprising:

regeneration means for, if the error information indicates the presence of an error, regenerating data in the block with the error using data in the other blocks in the group to which the block with the error belongs, wherein the judgement means judges that the error information stored in the memory should not be written to the predetermined group for a duration when the regeneration means performs the regeneration operation.

8. The data storage array apparatus according to claim 7, wherein the judgement means judges that the error information stored in the memory should be written to the predetermined group, if (a) there are no any access requests from the outside of the apparatus, and (b) the regeneration means does not perform the regeneration operation.

9. The data storage array apparatus according to claim 1, wherein the judgement means changes a frequency for judgement as a writing/reading frequency by the writing/reading means changes.

10. The data storage array apparatus according to claim 1, further comprising:

a nonvolatile memory having a storage area for storing the error information, wherein the control means writes the error information into the nonvolatile memory immediately before a power of the data storage array apparatus turned OFF.

11. The data storage array apparatus according to claim 10, wherein the error information is bit map data including a flag for each block, the flag indicating the presence or absence of a write time-out error, wherein the data storage array apparatus further comprising:

regeneration means for (a) reading the bit map data from the nonvolatile memory immediately after the power of the data storage array apparatus turned ON or being reset, and (b) if only one flag indicates an error state, inhibiting a reading operation from a block corresponding to the flag, and regenerating data in the block.

12. The data storage array apparatus according to claim 10, wherein the error information is bit map data including a flag for each block, the flag indicating the presence or absence of a write time-out error, wherein the data storage array apparatus further comprising:

regeneration means for (a) reading the bit map data from the predetermined group immediately after the power of the data storage array apparatus turned ON or being reset and generating a reading bit map containing a flag indicating a reading error caused by the reading operation for each block in the predetermined group, (b) carrying out the logical OR between the generated reading bit map and a part of the bit map data that is stored in the nonvolatile memory and corresponds to each group, and (c) if the bit map obtained from the logical OR indicates only one error, inhibiting a reading operation from the block with the error and regenerating data in the block.

13. The data storage array apparatus according to claim 1, wherein the error information is bit map data including a flag for each block, the flag indicating the presence or absence of a write time-out error, wherein the data storage array apparatus further comprising:

a nonvolatile memory, wherein the control means generates second bit map data indicating the presence or absence of a write time-out error for each block in the predetermined group at a write operation of error information to the predetermined group and writes the generated second bit map data into the nonvolatile memory.

14. The data storage array apparatus according to claim 13, further comprising:

regeneration means for reading the second bit map data from the nonvolatile memory immediately after the power of the data storage array turned ON or being reset, and if only one flag in the second bit map data indicates an error state, inhibiting a reading operation from a block corresponding to the flag, and regenerating data in the block.

15. The data storage array apparatus according to claim 13, further comprising:

regeneration means for (a) reading the bit map data from the predetermined group immediately after the power of the data storage array apparatus turned ON or being reset and generating a reading bit map containing a flag indicating a reading error caused by the reading operation for each block in the predetermined group, (b) carrying out the logical OR between the generated reading bit map and the second bit map data that is stored in the nonvolatile memory, and (c) if the bit map obtained from the logical OR indicates only one error, inhibiting a reading operation from the block with the error and regenerating data in the block.

16. The data storage array apparatus according to claim 1, further comprising:

a nonvolatile memory having a storage area for storing the error information, wherein the control means controls the writing/reading means to read the error information from the memory and write the error information to the predetermined group in accordance with a result obtained from the judgement means, and writes the error information into the nonvolatile memory.

17. The data storage array apparatus according to claim 1, further comprising:

notification means for, if the writing/reading means fails to write the error information to the predetermined group, notifying an external device as such.

18. A data storage array apparatus that includes a plurality of disk devices which each have a storage area divided into a plurality of blocks, each block in a disk device forming a group together with corresponding blocks in the other disk devices, and that writes/reads striped data and parity data to/from a group, the data storage array apparatus comprising:

writing/reading means for writing/reading the striped data and the parity data to/from a group in accordance with an access request inputted from the outside of the apparatus;

error information generation means for generating error information indicating the presence or absence of an error for each group caused by a writing operation by the writing/reading means and storing the generated error information in a memory;

judgement means for, each time the writing/reading means completes a writing operation, judging whether error information stored in the memory should be written to a nonvolatile memory; and control means for reading error information from the memory and writing the error information into the nonvolatile memory in accordance with a result obtained from the judgement means.

19. The data storage array apparatus according to claim 18, wherein the error information is bit map data including a flag for each block, each flag indicating the presence or absence of a write time-out error or a medium error.

20. The data storage array apparatus according to claim 18, wherein the judgement means judges that the error information stored in the memory should be written into the nonvolatile memory if there are no any access requests from the outside of the apparatus.

21. The data storage array apparatus according to claim 18, further comprising:

a queue for queuing the access requests from the outside of the apparatus, wherein the writing/reading means inputs the access request from the outside of the apparatus through the queue, and the judgement means judges that the error information stored in the memory should be written into the nonvolatile memory if there are no any access requests in the queue.

22. The data storage array apparatus according to claim 18, wherein the judgement means counts the number of times of writing operations by the writing/reading means, and judges that the error information stored in the memory should be written into the nonvolatile memory if the counted number of times is a threshold value or above, wherein the counted number of times is reset each time the error information is written.

23. The data storage array apparatus according to claim 18, further comprising:

regeneration means for, if the error information indicates the presence of an error, regenerating data in the block with the error using data in the other blocks in the group to which the block with the error belongs, wherein the judgement means judges that the error information stored in the memory should not be written into the nonvolatile memory for a duration when the regeneration means performs a regeneration operation.

24. The data storage array apparatus according to claim 23, wherein the judgement means judges that the error information stored in the memory should be written into the nonvolatile memory, if (a) there are no any access requests from the outside of the apparatus, and (b) the regeneration means does not perform the regeneration operation.

25. The data storage array apparatus according to claim 18, wherein the judgement means changes a frequency for judgement as a writing/reading frequency by the writing/reading means changes.

26. A method for controlling a data storage array apparatus that includes a plurality of disk devices which each have a storage area divided into a plurality of blocks, each block in a disk device forming a group together with corresponding blocks in the other disk devices, and that writes/reads striped data and parity data to/from a group, the method comprising the steps of:

a writing/reading step for writing/reading the striped data and the parity data to/from a group in accordance with an access request inputted from the outside of the apparatus;

an error information generation step for generating error information indicating the presence or absence of an error for each group caused by a writing operation in the writing/reading step and storing the generated error information in a memory;

a judgement step for, each time the writing/reading step completes a writing operation, judging whether error information stored in the memory should be written to a predetermined group; and a writing step for reading error information from the memory and writing the error information to the predetermined group in accordance with a result obtained from the judgement step.

27. A program recording medium that records a program executed by a processor in a data storage array apparatus that includes a plurality of disk devices which each have a storage area divided into a plurality of blocks, each block in a disk device forming a group together with corresponding blocks in the other disk devices, and that writes/reads striped data and parity data to/from a group, the program making the processor execute the steps of:

a writing/reading step for writing/reading the striped data and the parity data to/from a group in accordance with an access request inputted from the outside of the apparatus;

an error information generation step for generating error information indicating the presence or absence of an error for each group caused by a writing operation in the writing/reading step and storing the generated error information in a memory;

a judgement step for, each time the writing/reading step completes a writing operation, judging whether error information stored in the memory should be written to a predetermined group; and a writing step for reading error information from the memory and writing the error information to the predetermined group in accordance with a result obtained from the judgement step.

* * * * *